(12) United States Patent
Hatta

(10) Patent No.: US 11,529,753 B2
(45) Date of Patent: Dec. 20, 2022

(54) METHOD FOR MANUFACTURING FIBER REINFORCED RESIN MOLDED ARTICLE, AND MANUFACTURING DEVICE THEREOF

(71) Applicant: TOYOTA JIDOSHA KABUSHIKI KAISHA, Toyota (JP)

(72) Inventor: Ken Hatta, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 13 days.

(21) Appl. No.: 17/170,111

(22) Filed: Feb. 8, 2021

(65) Prior Publication Data

US 2021/0299919 A1    Sep. 30, 2021

(30) Foreign Application Priority Data

Mar. 25, 2020 (JP) .............................. JP2020-054499

(51) Int. Cl.
*B29C 43/18* (2006.01)
*B29C 45/56* (2006.01)
*B29C 45/00* (2006.01)
*B29C 70/46* (2006.01)

(52) U.S. Cl.
CPC ........ *B29C 43/183* (2013.01); *B29C 45/0005* (2013.01); *B29C 45/561* (2013.01); *B29C 70/467* (2013.01); *B29C 2043/181* (2013.01)

(58) Field of Classification Search
CPC ...... B29C 2045/2683; B29C 2045/384; B29C 45/382; B29C 2045/2687; B29C 70/48; B29C 45/561
See application file for complete search history.

(56) References Cited

U.S. PATENT DOCUMENTS

| 4,359,435 A | * | 11/1982 | Kogure | ................... B29C 45/73 |
| | | | | 425/DIG. 11 |
| 2003/0214065 A1 | * | 11/2003 | Doyle | ..................... B29C 45/27 |
| | | | | 264/328.12 |
| 2019/0084249 A1 | * | 3/2019 | Hatta | ....................... F17C 1/16 |

FOREIGN PATENT DOCUMENTS

| DE | 10 2018 122 957 A1 | 3/2019 |
| JP | 2001-269969 A | 10/2001 |
| JP | 2019-056415 A | 4/2019 |
| WO | WO 99/46100 | 9/1999 |

* cited by examiner

*Primary Examiner* — Matthew J Daniels
(74) *Attorney, Agent, or Firm* — Finnegan, Henderson, Farabow, Garrett & Dunner, LLP

(57) ABSTRACT

Provided is a method for manufacturing a fiber reinforced resin molded article capable of effectively reducing the occurrence of a preform with poor resin impregnation, and such a manufacturing device thereof. After it is detected that a predetermined amount (the same amount) of resin has been individually poured into a plurality of cavities provided in a mold, the fiber layers of preforms are impregnated (compressively filled) with resin. Pressure sensors for detecting a resin injection amount are used. When closing runners, a small gap is formed in the runners.

2 Claims, 9 Drawing Sheets

METHOD FOR MANUFACTURING FIBER REINFORCED RESIN MOLDED ARTICLE, AND MANUFACTURING DEVICE THEREOF

CROSS REFERENCE TO RELATED APPLICATIONS

The present application claims priority from Japanese patent application JP 2020-054499 filed on Mar. 25, 2020, the entire content of which is hereby incorporated by reference into this application.

BACKGROUND

Technical Field

The present disclosure relates to methods for manufacturing fiber reinforced resin molded articles, such as a high-pressure tank that is reinforced with fibers, and manufacturing devices thereof.

Background Art

Fuel cell vehicles include a high-pressure tank (hereinafter, simply may be called a tank) that stores fuel gas such as natural gas or hydrogen gas. Such a high-pressure tank is prepared as a fiber reinforced resin molded article that includes a hollow liner having a gas barrier property as a core member, and carbon fiber reinforced plastic or glass fiber reinforced plastic (hereinafter collectively called a fiber reinforced resin layer) that coats the liner. For lightweight, a hollow container made of resin is typically used as the liner.

High-pressure tanks have been conventionally manufactured by the filament winding (FW) method and the resin transfer molding (RTM) method. JP 2019-056415 A, for example, discloses a method for manufacturing a high-pressure tank by the RTM method. This manufacturing method places a preform in a mold, the preform including a liner defining the inner space of the high-pressure tank and a fiber layer formed on the outer surface of the liner, and rotates the preform in the mold in the circumferential direction about the central axis of the preform while injecting resin from a gate toward the preform placed in the mold.

SUMMARY

By the way, when a plurality of cavities is provided in the mold and the fiber layers of a plurality of preforms are simultaneously impregnated with resin to increase productivity, it is hard to pour the same amount of resin in the individual cavities (see, for example, JP 2001-269969 A). This may lead to the occurrence of a preform with poor resin impregnation.

In view of the above problems, the present disclosure provides a method for manufacturing a fiber reinforced resin molded article capable of effectively reducing the occurrence of a preform with poor resin impregnation, and such a manufacturing device thereof.

According to one aspect of the present disclosure, there is disclosed a method for manufacturing a fiber reinforced resin molded article to form a preform including a fiber layer on an outer surface of a liner, impregnate the fiber layer of the preform with resin, and cure the resin, and the method includes: a step of preparing a mold including a first mold and a second mold, the first mold and the second mold forming a plurality of cavities, each being provided with a runner for pouring resin thereinto; a step of placing the preform in each cavity between the first mold and the second mold so as to define a first gap between the first mold and the preform and a second gap between the second mold and the preform, the second gap being larger than the first gap; a step of pouring resin into each cavity through a runner thereof; a step of sequentially closing a runner connecting to a cavity, the cavity being determined to have a resin injection amount of greater than or equal to a predetermined value; and a step of bringing the second mold close to the preform for compressive filling with the resin in each cavity after it is determined that resin injection amounts in all of the cavities are greater than or equal to a predetermined value.

In some embodiments, in the step of closing a runner, when a pressure of resin detected by a pressure sensor disposed for each cavity is higher than or equal to a predetermined threshold, it is determined that a resin injection amount in a cavity is greater than or equal to a predetermined value.

In some embodiments, in the step of closing a runner, a gap is formed in the runner for pressure retention.

In some embodiments, in case of a delay from a predetermined time in a timing when it is determined that a resin injection amount in a cavity is greater than or equal to a predetermined value, a fiber reinforced resin molded article formed in the cavity is determined as a defect.

In some embodiments, in the step of closing a runner, if it is not determined that a resin injection amount in a cavity is greater than or equal to a predetermined value even after a lapse of a predetermined time from start of resin pouring, a runner connecting to the cavity is closed and a fiber reinforced resin molded article formed in the cavity is determined as a defect.

According to another aspect of the present disclosure, there is disclosed a device for manufacturing a fiber reinforced resin molded article to form a preform including a fiber layer on an outer surface of a liner, impregnate the fiber layer of the preform with resin, and cure the resin, and the device includes: a mold including a first mold and a second mold, the first mold and the second mold forming a plurality of cavities, each being provided with a runner for pouring resin thereinto; a driving mechanism configured to drive the mold in a direction to open and close the mold; a resin pouring mechanism configured to pour resin into each cavity through a runner thereof; an open/close mechanism configured to open and close the runner; and a control device configured to control operating states of the driving mechanism, the resin pouring mechanism, and the open/close mechanism, the control device being configured to control the driving mechanism to place the preform in each cavity between the first mold and the second mold so as to define a first gap between the first mold and the preform and a second gap between the second mold and the preform, the second gap being larger than the first gap; control the resin pouring mechanism to pour resin into each cavity through a runner thereof; control the open/close mechanism to sequentially close a runner connecting to a cavity, the cavity being determined to have a resin injection amount of greater than or equal to a predetermined value; and control the driving mechanism to bring the second mold close to the preform for compressive filling with the resin in each cavity after it is determined that resin injection amounts in all of the cavities are greater than or equal to a predetermined value.

In some embodiments, when a pressure of resin detected by a pressure sensor disposed for each cavity is higher than or equal to a predetermined threshold, the control device determines that a resin injection amount in a cavity is greater than or equal to a predetermined value.

In some embodiments, when the control device controls the open/close mechanism to close the runner, a gap is formed in the runner for pressure retention.

According to one aspect of the present disclosure, it is possible to first detect that a predetermined amount (the same amount) of resin has been individually poured into the plurality of the cavities provided in the mold and then impregnate (compressively till) the fiber layers of the preforms with the resin. This can reduce the occurrence of a preform with poor resin impregnation.

In addition, use of the pressure sensor can precisely detect the resin injection amount in each cavity.

Furthermore, when closing the runner, a small gap is formed in the runner. This can retain the pressure in the cavity, thus improving resin impregnation in each cavity.

DETAILED DESCRIPTION

The following describes an embodiment of the present disclosure, with reference to the attached drawings.

The following describes a high-pressure tank for fuel cell vehicles that is one example of a fiber reinforced resin molded article. The fiber reinforced resin molded article, to which the present disclosure is applied, is not limited to the high-pressure tank for fuel cell vehicles. The shape, the material, etc. of the liner and the preform of the fiber reinforced resin molded article are also not limited to the illustrated example.

The RTM method wraps (winds) carbon fiber around a liner multiple times (in multiple layers) to form a preform with a fiber layer on the outer surface of the liner, impregnates the fiber layer of the preform with epoxy resin, and cures the epoxy resin. In this way the RTM method manufactures a high-pressure tank for fuel cell vehicles including a fiber reinforced resin layer including the carbon fiber and the epoxy resin on the outer periphery of the liner. The liner is a hollow container made of resin (for example, nylon resin) that defines the inner space of the high-pressure tank.

In such a high-pressure tank for fuel cell vehicles, the carbon fiber is laminated thickly, and so the resin hardly enters into the inner layer of the carbon fiber. When resin is poured into the inner layer of the carbon fiber for impregnation at high pressure, the quality and performance of the tank will deteriorate, such as deformation of the tank. That is, the high-pressure tank for fuel cell vehicles has the carbon fiber that is laminated very thickly (about 10 times that of a typical RTM molded shell, exterior component) to keep enough strength, and it is difficult to impregnate the fiber with resin. When resin is poured for impregnation at high pressure, the pressure does not distribute uniformly, so that the quality and performance of the tank will deteriorate, such as deformation of the resin liner inside of the tank at a partially high-pressure part.

Furthermore, the tank has a cylindrical shape, and so it is hard to uniformly charge resin entirely, making the resin impregnation uniform.

In addition, when a plurality of tanks is formed simultaneously by resin impregnation to increase productivity, it is hard to pour resin at high pressure. This may cause an imbalance in resin pouring between the cavities in the mold, lead to poor resin impregnation, change the resin impregnation and cured state in each tank, and deteriorate the quality and performance of the high-pressure tank.

To avoid this, the present embodiment has the following configuration.

[Manufacturing Device of High-Pressure Tank]

Figure 1:
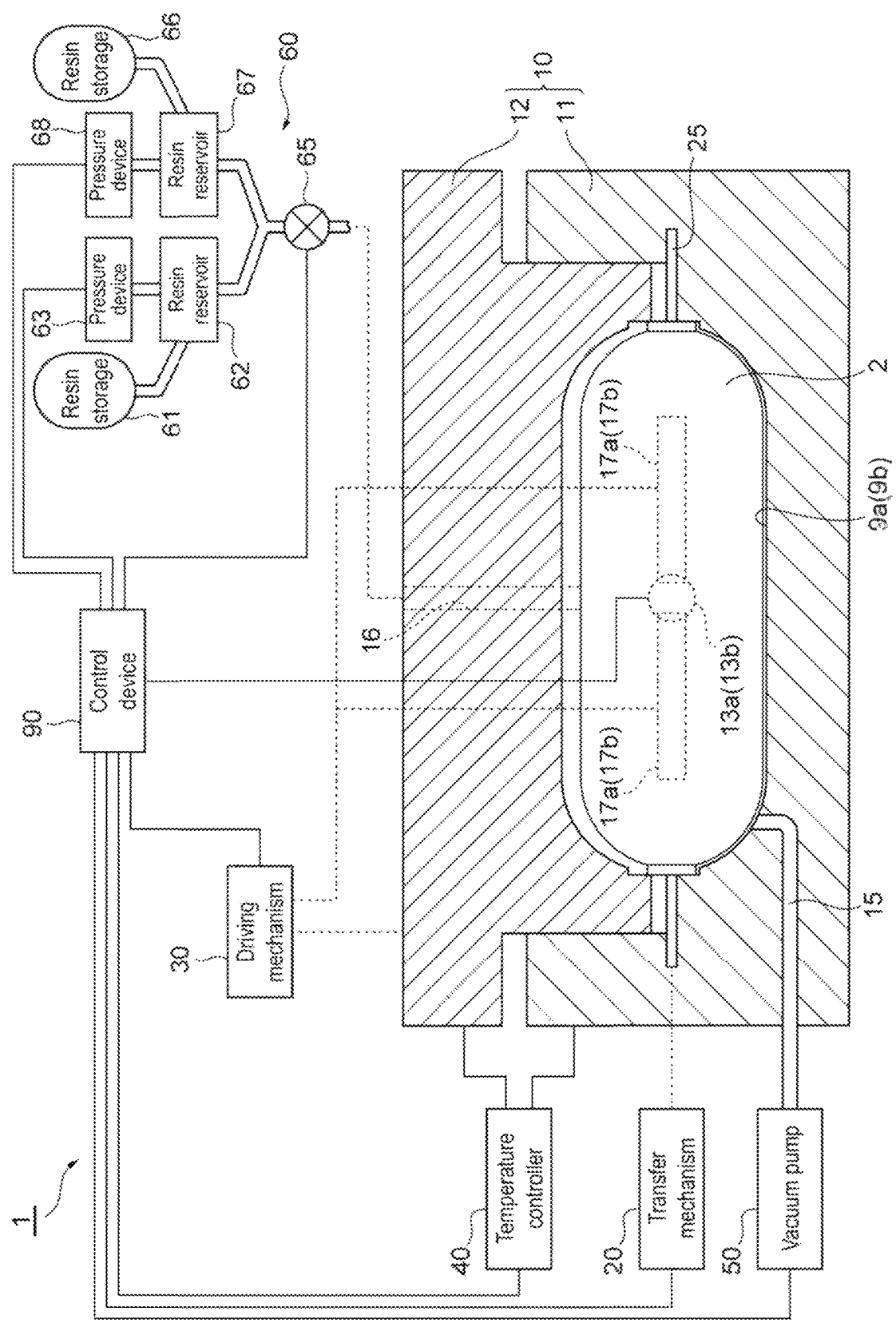
FIG. 1 is a vertical cross-sectional view of a manufacturing device of a high-pressure tank (fiber reinforced resin molded article) according to an embodiment.
Figure 2:
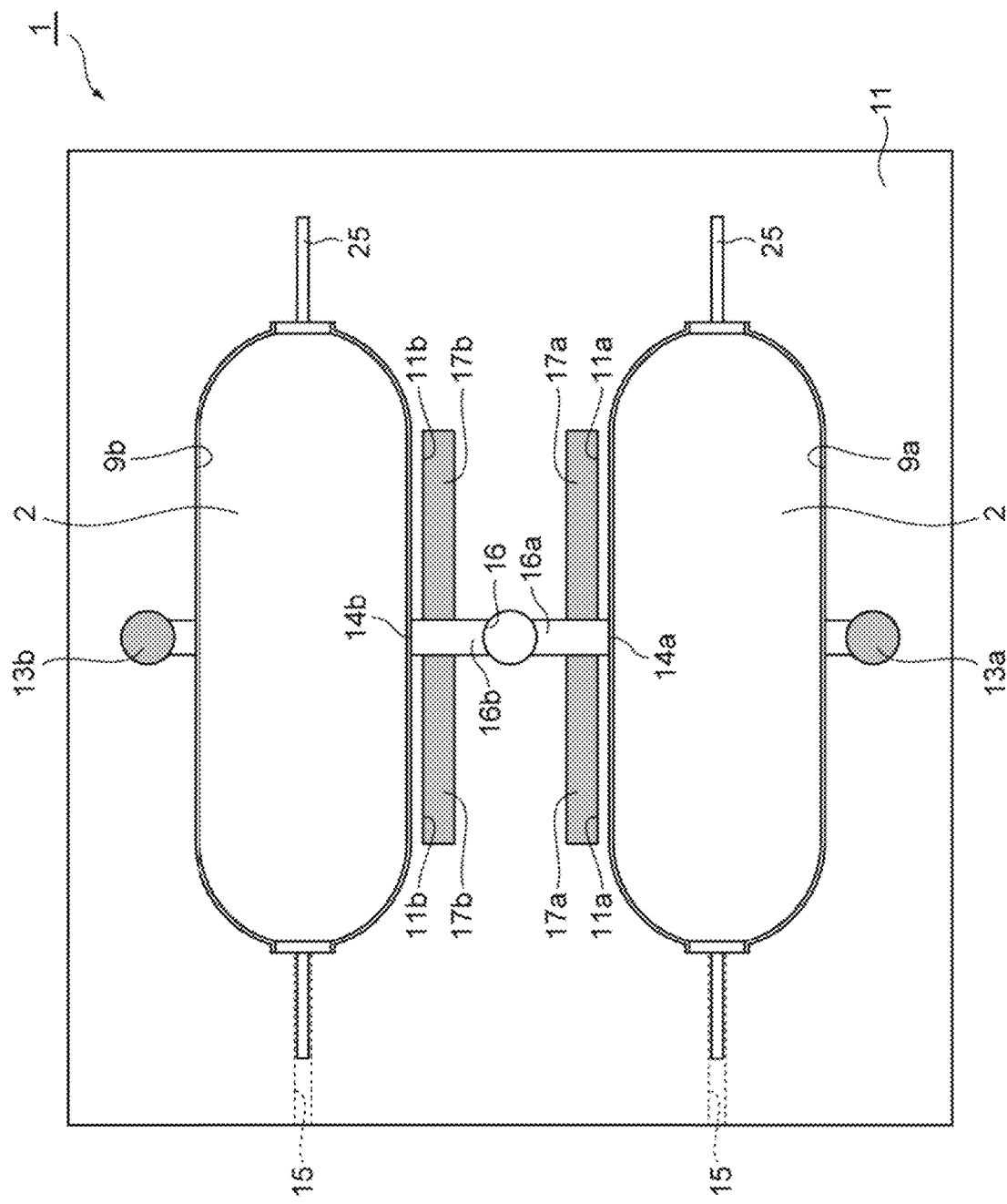
FIG. 2 is a top view of a lower mold of the manufacturing device of a high-pressure tank (fiber reinforced resin molded article), in which an upper mold is removed, according to the embodiment.

FIG. 1 and FIG. 2 show a manufacturing device of a high-pressure tank that is one example of a fiber reinforced resin molded article according to an embodiment. FIG. 1 is a vertical cross-sectional view and FIG. 2 is a top view of a lower mold in which an upper mold is removed.

A preform 2 as an intermediate body of the high-pressure tank to be manufactured in the present embodiment includes a liner and a fiber layer formed on the outer surface of the liner to be integrated with the liner. The liner is a resin hollow container having a gas barrier property and defining an inner space of the high-pressure tank. In one example, the fiber layer has a thickness of about 10 mm to 30 mm. The fiber layer is formed by wrapping fibers around the outer surface of the liner multiple times by the filament winding method.

Examples of the fiber wound around the liner include carbon fiber, glass fiber, and aramid fiber. The fibers may include continuous fibers, or include long fibers or short fibers. As described later, the fiber (layer) wound around the liner is impregnated with resin and cured to form a fiber reinforced resin layer that coats the periphery of the liner. Examples of the resin include thermosetting resins, such as epoxy resins, unsaturated polyester resins, and polyamide resins, and thermoplastic resins, such as polyethylene resins and polyester resins.

Figure 5:
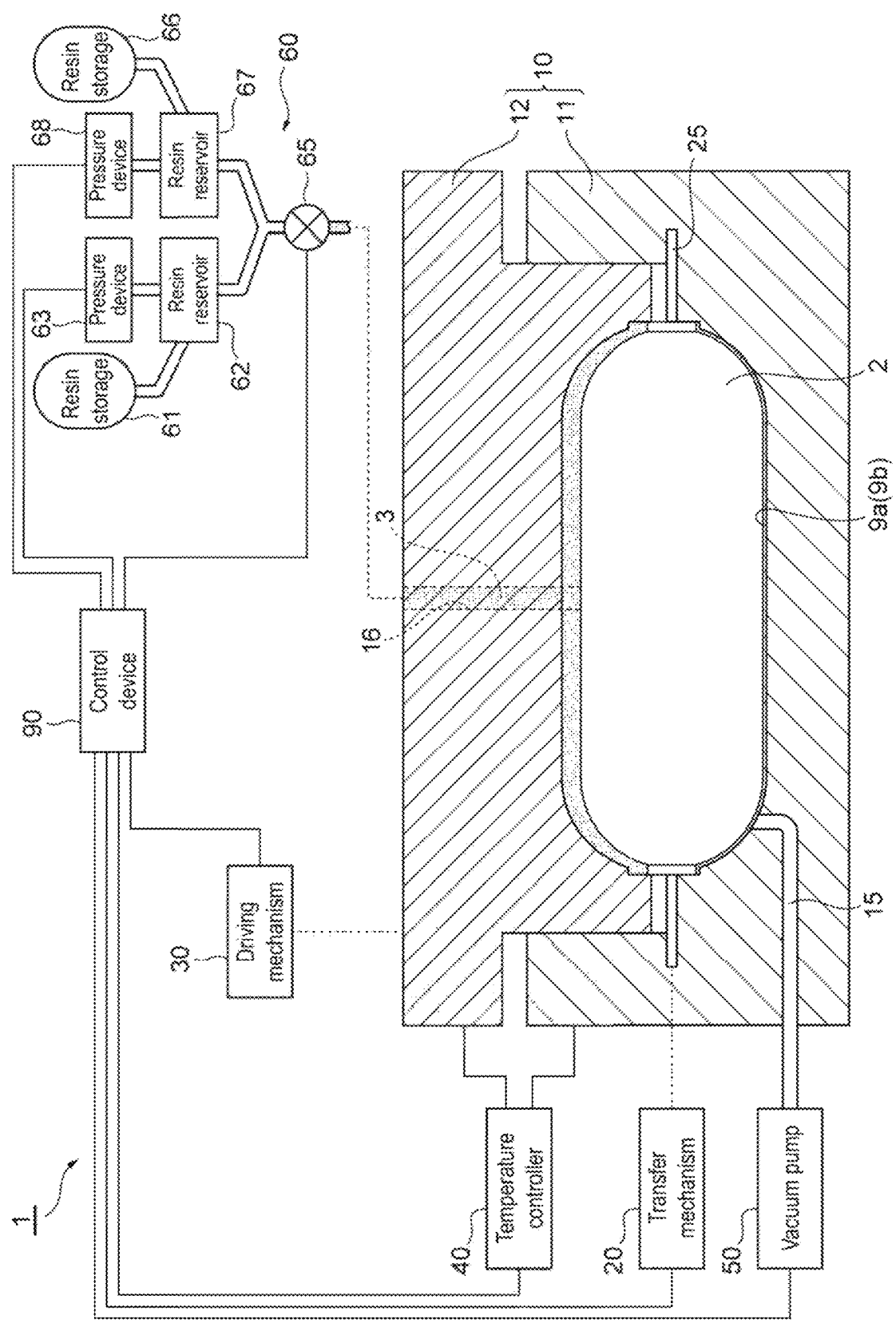
FIG. 5 is a vertical cross-sectional view of the manufacturing device of a high-pressure tank, showing a resin pouring step according to the embodiment.

The manufacturing device 1 is configured to manufacture a high-pressure tank by the RTM method to impregnate the fiber layer making up the preform 2 with resin 3 (reference numeral is shown in FIG. 5, for example) and cure the impregnated resin 3.

In one example, the manufacturing device 1 includes a mold 10 made up of a plurality of molds, such as a lower mold 11 as a fixed mold and an upper mold 12 as a moving mold. Closing of these lower mold 11 and upper mold 12 (this may be called mold clamping) defines a plurality of cavities for the fiber reinforced resin layer. To place the preform 2 having the lamination of fiber in the mold 10, the cavity of the mold 10 is made larger by the tolerance of the preform 2, for example. In the illustrated example, two cavities, one behind another, are formed (defined) in the mold 10 (between the upper mold 12 and the lower mold 11). Hereinafter, the front cavity is called a cavity 9*a* and the rear cavity is called a cavity 9*b*.

This embodiment includes the lower mold 11 as a fixed mold and the upper mold 12 as a moving mold (a mold that is movable relative to the fixed mold). In another embodiment, the upper mold 12 may be a fixed mold and the lower mold 11 may be a moving mold, or both of the lower mold 11 and the upper mold 12 may be movable. The mold 10 in this embodiment includes two parts of the lower mold 11 and the upper mold 12, which may be three or more of parts. In addition, the number of cavities formed in the mold 10 (between the upper mold 12 and the lower mold 11) is not limited to two, which may be three or more. The aspect of the arrangement of the plurality of cavities in the mold 10 is not limited to the illustrated example.

In the mold 10, the preform 2 is supported by a shaft 25 that is disposed along the axis of the liner. That is, the shaft 25 constitutes a support mechanism that supports the preform 2 in the mold 10 (in the cavities 9*a*, 9*b*).

A vacuum degassing pipe 15 is embedded in the mold 10 (in the lower mold 11 in the illustrated example) for each of the cavities 9*a*, 9*b*. The vacuum degassing pipe 15 connects to a vacuum pump 50. The vacuum pump 50 operates to degas (evacuate) the mold 10 (the cavities 9*a*, 9*b*) via the vacuum degassing pipe 15. That is, the vacuum pump 50 and the vacuum degassing pipe 15 constitute a vacuum degassing mechanism for vacuum degas of the mold 10 (the cavities 9*a*, 9*b*).

A resin pouring pipe (this may be called a resin pouring gate) 16 is embedded in the mold 10. The resin pouring pipe 16 connects to a resin injector 60. The resin injector 60 can pour (supply) resin 3 into the mold 10 (into the cavities 9*a*, 9*b*) (from gates 14*a*, 14*b*, which will be described later) through the resin pouring pipe 16 (described in detail later). In one example, the resin 3 is a two-component thermosetting epoxy resin composed of a base resin and a curing agent. The resin injector 60 therefore includes a resin storage 61, a resin reservoir 62, and a pressure device 63 for the base resin, a resin storage 66, a resin reservoir 67, and a pressure device 68 for the curing agent, and a valve 65 to supply the resin 3, which is a mixture of the base resin and the curing agent, to the resin pouring pipe 16.

In this example, the resin pouring pipe 16 extends from the upper mold 12 toward the lower mold 11 so as to pass through the space between the cavities 9*a*, 9*b* disposed one behind another. As shown in FIG. 2, the lower mold 11 includes (for the respective cavities) a runner 16*a*, which forms the gate (resin inlet) 14*a* opening to the front cavity 9*a*, and a runner 16*b*, which forms the gate (resin inlet) 14*b* opening to the rear cavity 9*b*, so as to be continuous to the resin pouring pipe 16. In this example, the gates 14*a*, 14*b* of the cavities 9*a*, 9*b* are disposed at the positions facing the central portion (in the axial direction) of the preform 2.

Furthermore, in this example, the shapes of the runner 16*a* and the gate (resin inlet) 14*a* for pouring resin into the front cavity 9*a* are the same as those of the runner 16*b* and the gate (resin inlet) 14*b* for pouring resin into the rear cavity 9*b*. However, the shapes may not be the same as long as an appropriate amount of the resin 3 can be poured (supplied) into the cavities 9*a*, 9*b*.

In addition, the lower mold 11 includes mounting grooves 11*a*, 11*b* having a predetermined length so as to be continuous to the runners 16*a*, 16*b*, respectively. In the mounting grooves 11*a*, 11*b*, runner cores 17*a*, 17*b* as movable cores are disposed to open and close the runners 16*a*, 16*b*.

While all of the runner cores 17*a*, 17*b* (i.e., both of the front and rear runner cores) are driven in the open direction such that all of the runners 16*a*, 16*b* are open, the resin 3 flowing through the resin pouring pipe 16 flows into the runners 16*a*, 16*b*, and the runners 16*a*, 16*b* are respectively communicating with the cavities 9*a*, 9*b*. This allows the resin injector 60 to pour (supply) the resin 3 through the resin pouring pipe 16 and the runners 16*a*, 16*b* into the cavities 9*a*, 9*b* in the mold 10 from the gates 14*a*, 14*b*. That is, the resin injector 60, the resin pouring pipe 16, and the runners 16*a*, 16*b* constitute a resin pouring mechanism for pouring the resin 3 into the mold 10 (into the cavities 9*a*, 9*b*).

For example, when the runner core 17*b* is driven in the close direction such that the runner 16*b* is closed (see FIG. 6), the flow of the resin 3 from the runner 16*b* to the cavity 9*b* is blocked, and the resin 3 flowing through the resin pouring pipe 16 flows only from the runner 16*a* into the cavity 9*a*. This allows the resin injector 60 to pour (supply) the resin 3 through the resin pouring pipe 16 and the runner 16*a* into the cavity 9*a* in the mold 10 from (only) the gate 14*a*. That is, in this case, the resin injector 60, the resin pouring pipe 16, and the runner 16*a* constitute a resin pouring mechanism for pouring the resin 3 into the mold 10 (into the cavity 9*a*). In addition, the runner cores 17*a*, 17*b* disposed for the runners 16*a*, 16*b* constitute an open/close mechanism for opening and closing the runners 16*a*, 16*b*.

In the present embodiment, the resin 3 is supplied to the gates 14*a*, 14*b* through the common resin pouring pipe 16 (resin injector 60).

As shown in FIG. 2, pressure sensors 13*a*, 13*b* are embedded in the mold 10 (in the lower mold 11 in the illustrated example) for the cavities 9*a*, 9*b*, respectively. In this example, the pressure sensors 13*a*, 13*b* are each disposed at the position facing the central portion (in the axial direction) of the preform 2, opposite to the gates 14*a*, 14*b*, in the lower mold 11, that is, the position facing the resin flow end portion of the preform 2, at which the resin poured from the gates 14*a*, 14*b* is assumed to reach at the latest time. The pressure sensors 13*a*, 13*b* individually detect the pressure of the resin 3 flowing in the cavities 9*a*, 9*b* to detect the resin injection amounts in the cavities 9*a*, 9*b*. Pressure information (resin pressure) obtained by the pressure sensors 13*a*, 13*b* is input to a control device 90, which will be described later. The control device 90 can detect the resin injection amount in each of the cavities 9*a*, 9*b* on the basis of the pressure information (resin pressure) obtained by the pressure sensors 13*a*, 13*b*. When the pressure of the resin 3 obtained by each of the pressure sensors 13*a*, 13*b* is higher than or equal to a predetermined threshold, for example, the control device 90 detects that the injection amount of the resin 3 in each of the cavities 9*a*, 9*b* is greater than or equal to a predetermined value and the resin is completely charged into each of the cavities 9*a*, 9*b*. The control device 90 also controls open/closed states of the runner cores 17*a*, 17*b* on the basis of the detection results.

By disposing the pressure sensors 13a, 13b in the position opposite to the gates 14a, 14b from which the resin 3 is poured into the cavities 9a, 9b, that is, the position facing the resin flow end portion of the preform 2, it is possible to precisely detect the resin injection amount in each of the cavities 9a, 9b.

In this example, the pressure sensors 13a, 13b are used as detecting units for detecting the resin injection amounts in the cavities 9a, 9b, but may also be used as detecting units such as a deformation sensor or a temperature sensor.

The manufacturing device 1 includes: a transfer mechanism 20 to transfer the preform 2 to a predetermined position; a driving mechanism 30 to drive the mold 10 (specifically, the upper mold 12) in the direction to open and close the mold (vertical direction) and drive the runner cores 17a, 17b in the direction to open and close the runners 16a, 16b; a temperature controller 40 to control the temperature of the mold 10 (lower mold 11, upper mold 12); and a control device 90 as a controller to control the operating state of the entire manufacturing device 1 (specifically, the operating states of the transport mechanism 20, the driving mechanism 30, the temperature controller 40, the vacuum pump 50 in the vacuum degassing mechanism, and the pressure devices 63 and 68 and the valve 65 of the resin injector 60 in the resin pouring mechanism, etc.).

Method for Manufacturing a High-Pressure Tank

Figure 3:
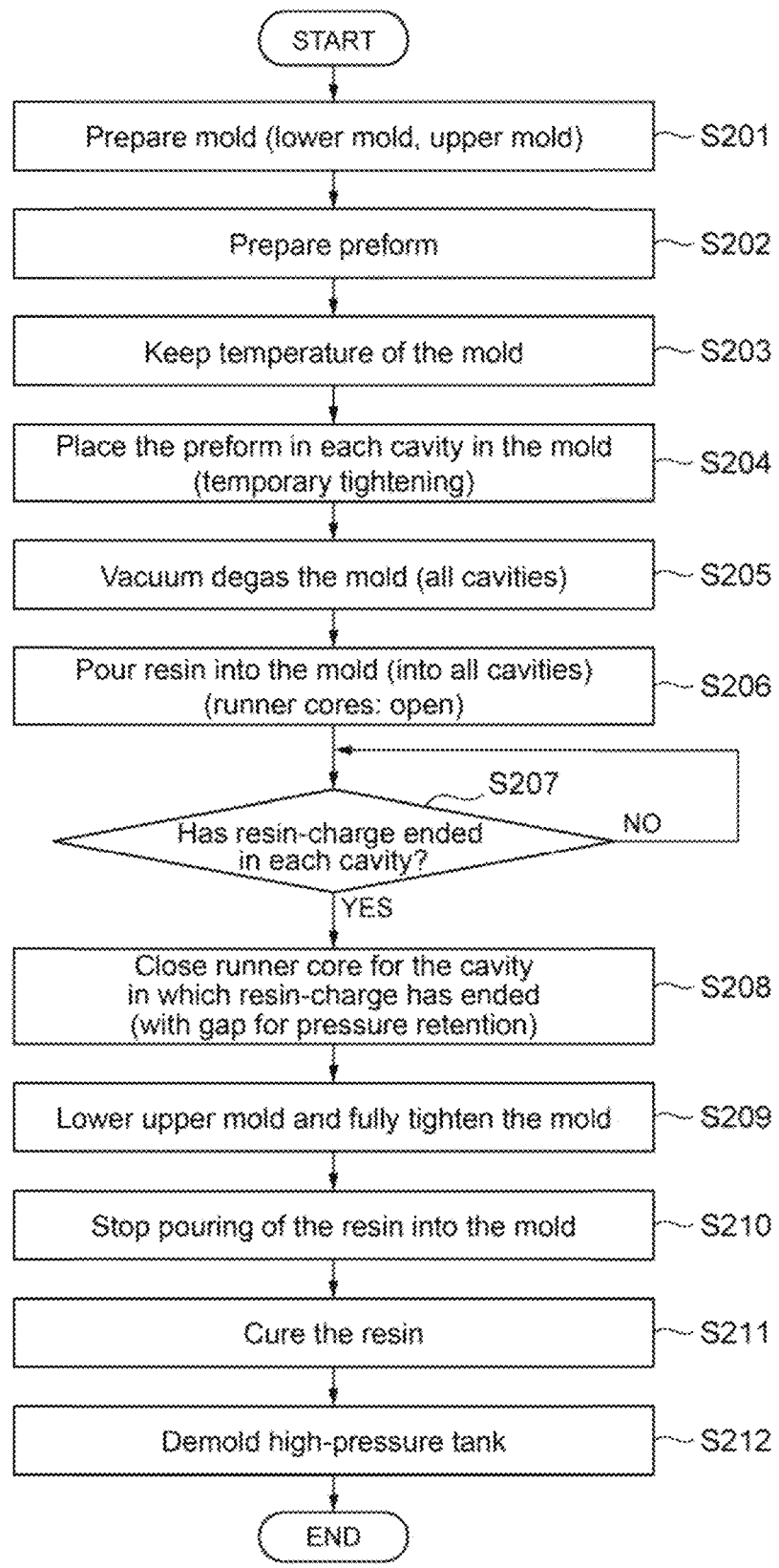
FIG. 3 is a flowchart of a method for manufacturing a high-pressure tank (fiber reinforced resin molded article) according to the embodiment.
Figure 6:
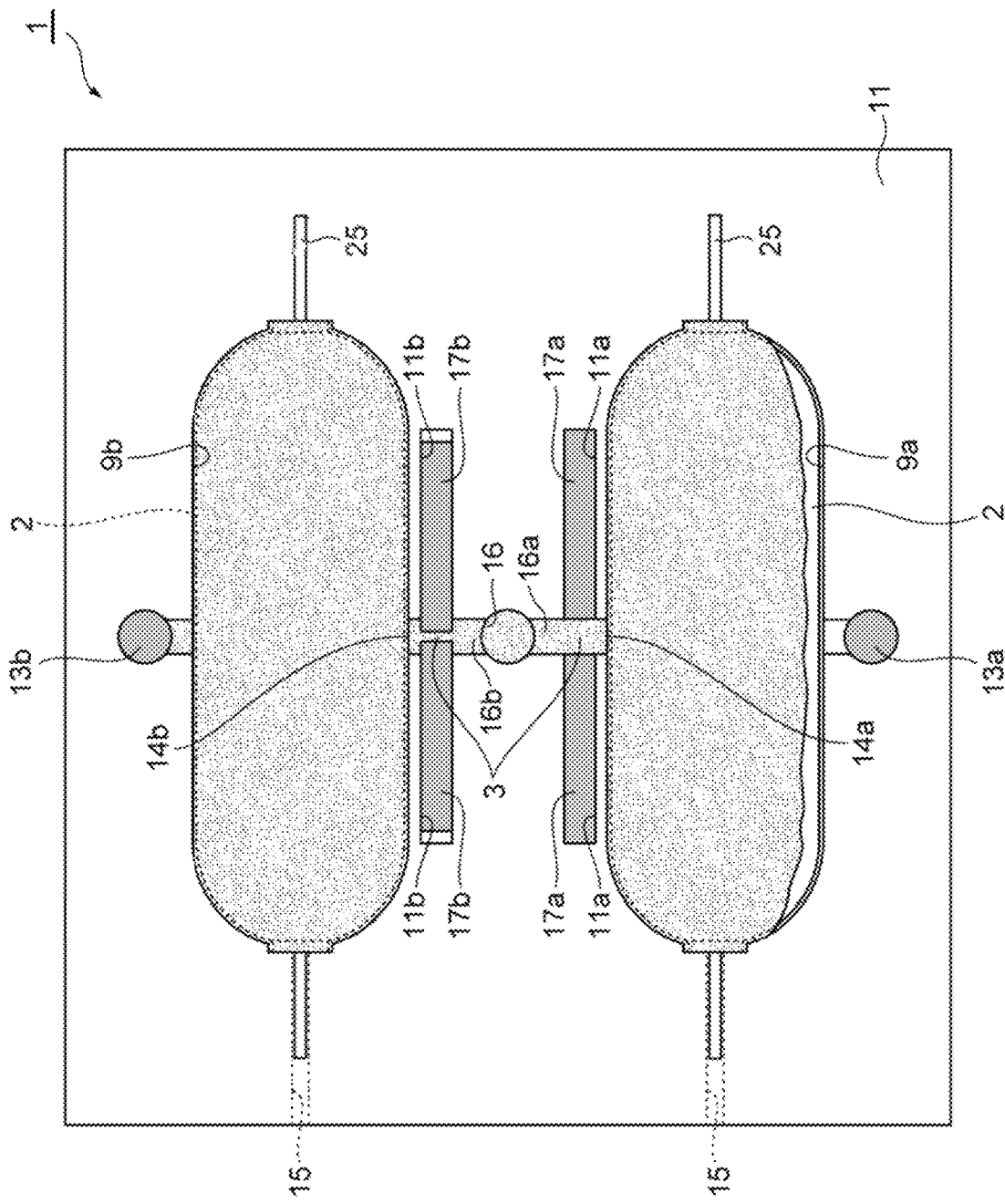
FIG. 6 is a top view of the lower mold of the manufacturing device of a high-pressure tank, in which the upper mold is removed, showing a runner core closing step (front runner core: open, rear runner core: closed) according to the embodiment.
Figure 7:
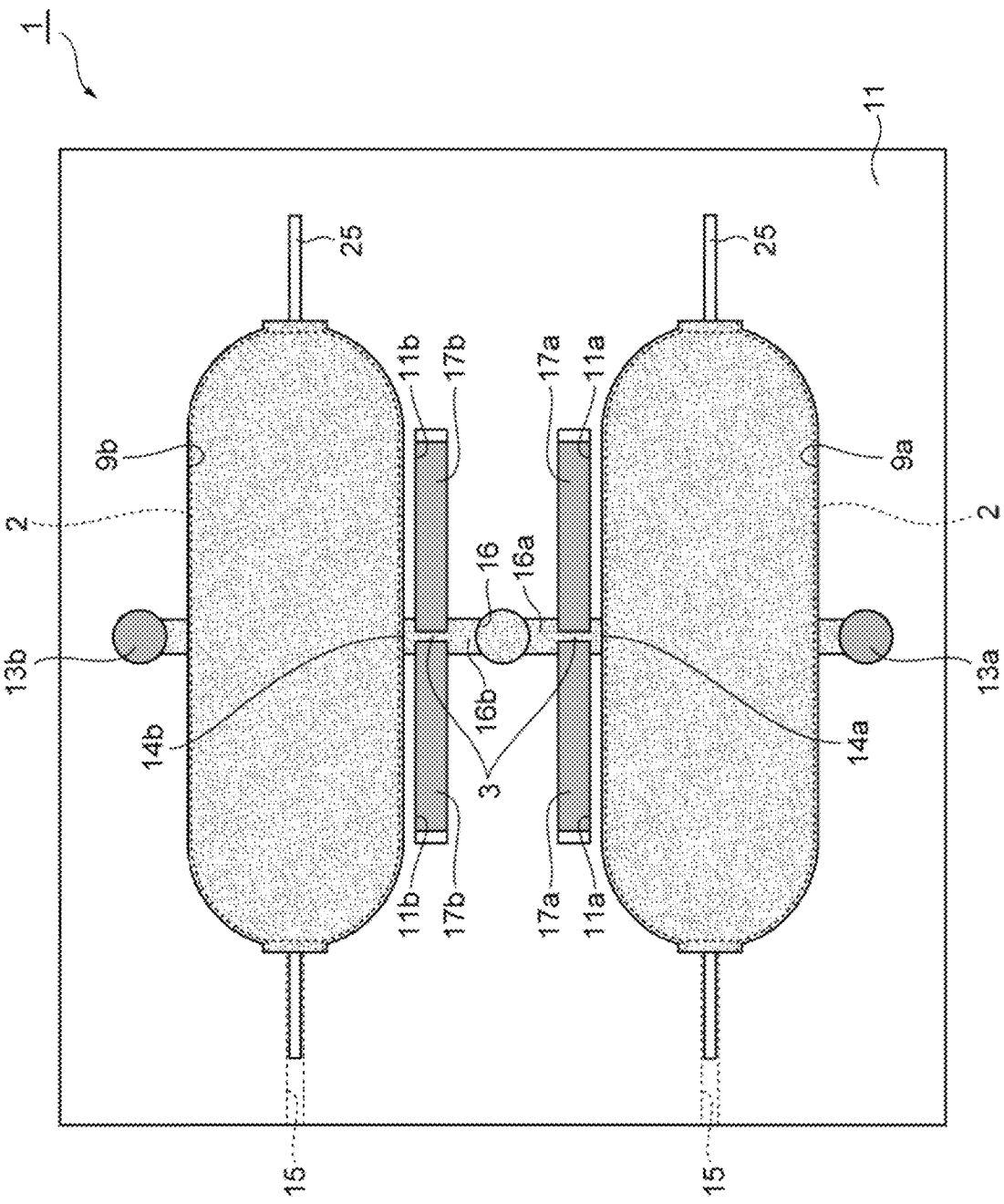
FIG. 7 is a top view of the lower mold of the manufacturing device of a high-pressure tank, in which the upper mold is removed, showing a runner core closing step (all runner cores: closed) according to the embodiment.

FIG. 3 is a flowchart illustrating a method for manufacturing a high-pressure tank that is an example of the fiber reinforced resin molded article according to the embodiment. FIG. 4, FIG. 5, FIG. 8, and FIG. 9 are vertical cross-sectional views respectively showing a preform placing step and a vacuum degassing step; a resin pouring step; a fully tightening step; and a resin-pouring stop step and a resin curing step. FIG. 6 and FIG. 7 are top views of the lower mold, in which the upper mold is removed, respectively showing a runner core closing step (front runner core; open, rear runner core: closed) and a runner core closing step (all runner cores: closed).

(Mold preparation step: S201)

Firstly, the method prepares the mold 10 including the lower mold 11 and the upper mold 12 having the above-described structure. The lower mold 11 is provided with the runners 16a, 16b, the runner cores 17a, 17b, and the pressure sensors 13a, 13b for the cavities 9a, 9b, respectively.

(Preform preparation step: S202)

As described above, the method prepares the preform 2 beforehand, in which a fiber layer is formed by wrapping (winding) fiber around the outer surface of the liner.

(Mold temperature-retention step: S203)

Next, the method makes the control device 90 control the temperature controller 40 so as to keep the temperature of the mold 10 (lower mold 11, upper mold 12) to a predetermined temperature. When the resin 3 is a thermosetting resin, this predetermined temperature is equal to or higher than the curing temperature of the resin 3.

The method in this example keeps the temperature of the mold 10 to be the curing temperature of the resin 3 or higher at the beginning. In another example, the temperature of the mold 10 may be kept to be less than the curing temperature of the resin 3 at the beginning, and at an appropriate timing in a step described later (e.g., after fully tightening of the mold 10), the temperature of the mold 10 may be kept to be the curing temperature or higher of the resin 3.

(Preform placing step: S204)

Figure 4:
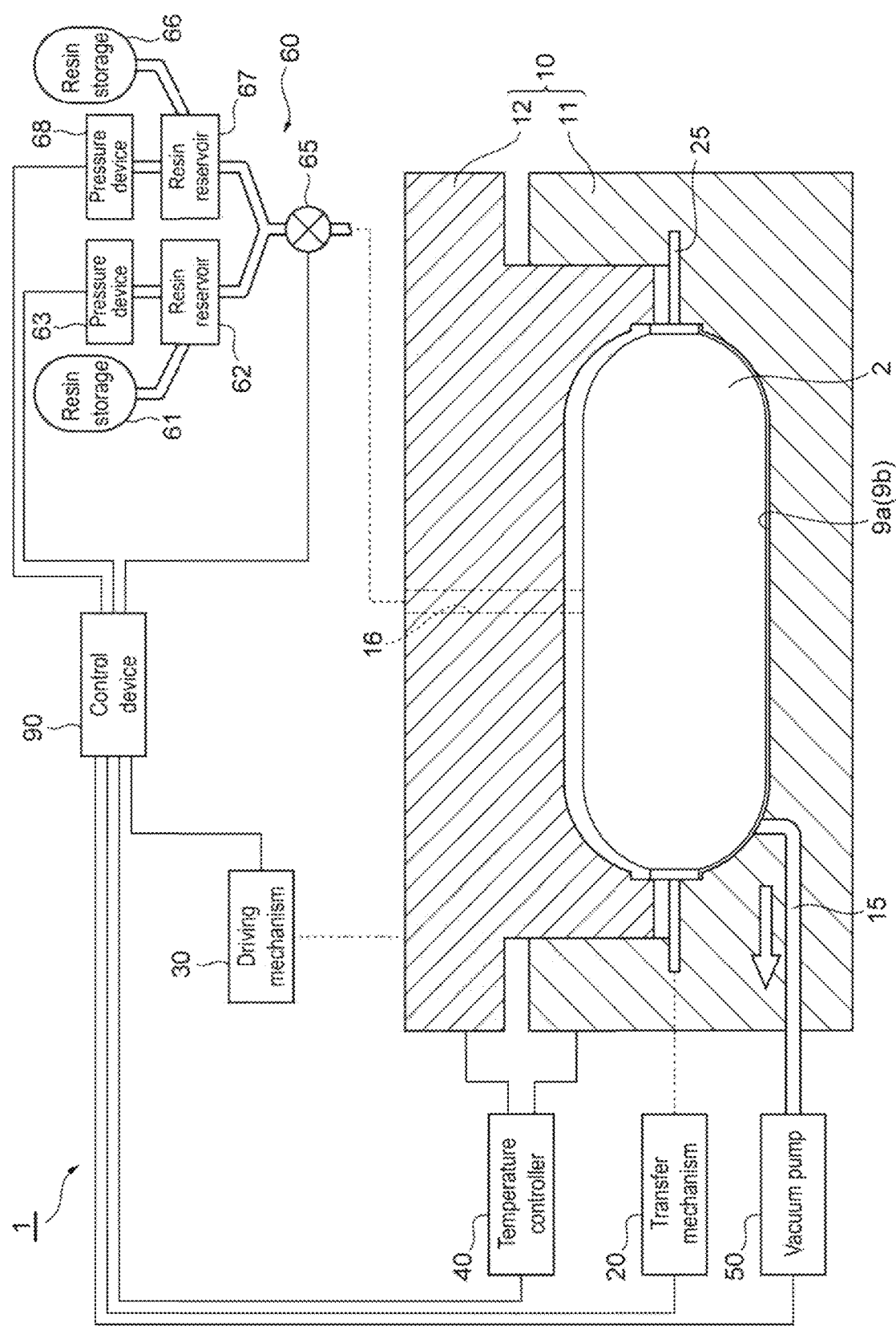
FIG. 4 is a vertical cross-sectional view of the manufacturing device of a high-pressure tank, showing a preform placing step and a vacuum degassing step according to the embodiment.

Subsequently, the control device 90 controls the transfer mechanism 20 and the driving mechanism 30 to place the preform 2 in each of the cavities 9a, 9b in the mold 10 (that is, between the lower mold 11 and the upper mold 12) (FIG. 1, FIG. 4). Specifically, while opening the upper mold 12, the transfer mechanism 20 places the preform 2 on the portion corresponding to each of the cavities 9a, 9b in the lower mold 11 under the control of the control device 90. At this time, the shaft 25 supports the preform 2. After that, the driving mechanism 30 starts mold clamping under the control of the control device 90 and temporarily tightens the upper mold 12. Temporary tightening is an intermediate state between the state where the upper mold 12 is open and the fully tightening state, and the lower mold 11 and the upper mold 12 has a gap therebetween in the temporary tightening state. As shown in FIG. 4, the upper mold 12 moves to a position having a gap (second gap) of several mm with the preform 2. This gap (second gap) between the upper mold 12 and the preform 2 is larger than a gap (first gap) between the lower mold 11 and the preform 2.

(Vacuum degassing step: S205)

Next, the control device 90 controls the vacuum pump 50 while keeping the above-mentioned temporary tightening state (i.e., before completion of mold clamping) to degas the mold 10 (all of the cavities 9a, 9b)(FIG. 4).

(Resin pouring step: S206)

After stopping (or completion of) the above-stated vacuum degassing, the resin 3 is injected/poured into the mold 10 (into all of the cavities 9a, 9b) (FIG. 5). Specifically, the control device 90 opens the valve 65, pressurizes the base resin stored in the resin reservoir 62 with the pressure device 63, and pressurizes the curing agent stored in the resin reservoir 67 with the pressure device 68 to mix the base resin and the curing agent and prepare (uncured) resin 3. At this time, the control device 90 controls the driving mechanism 30 to open all of the runner cores 17a, 17b. This lets the (uncured) resin 3 flow through the resin pouring pipe 16 that extends from the upper mold 12 to the lower mold 11, so that the resin 3 is injected/poured toward the preforms 2 from the gates (in the illustrated example, the gates at the central portions of the preforms 2) 14a, 14b through the runners 16a, 16b connecting to the cavities 9a, 9b. Since the upper mold 12 is temporarily tightened, the resin 3 is injected and poured mainly into the gap (second gap) between the upper mold 12 and the (upper face of) preform 2.

(Resin-charge end determination step: S207)

Next, for each of the cavities, the method determines whether the injection amount of the resin 3 injected and poured into each of the cavities 9a, 9b in the mold 10 is greater than or equal to a predetermined value and the resin is completely charged. Specifically, the control device 90 determines whether the pressure of the resin 3 obtained by each of the pressure sensors 13a, 13b disposed for the cavities 9a, 9b is higher than or equal to a predetermined threshold. If the pressure of the resin 3 obtained by each of the pressure sensors 13a, 13b is higher than or equal to a predetermined threshold, the control device 90 determines that the injection amount of the resin 3 injected and poured into each of the cavities 9a, 9b in the mold 10 is greater than or equal to a predetermined value and the resin is completely charged (S207: Yes), and proceeds to the next step S208.

(Runner core closing step: S208)

If the control device 90 determines, for each of the cavities, that the injection amount of the resin 3 injected and poured into the cavity in the mold 10 is greater than or equal to a predetermined value and the resin is completely charged (i.e., in the illustrated example, if the control device 90 determines that the resin is completely charged into the rear cavity 9b), the control device 90 controls the driving mechanism 30 to close the runner core 17b disposed for the runner 16b connecting to the cavity 9b (FIG. 6). This lets the (uncured) resin 3 flow through the resin pouring pipe 16 that extends from the upper mold 12 to the lower mold 11 while the runner core 17b (that is, the runner 16b) is closed under the control of the control device 90, so that the resin 3 is injected/poured toward the preform 2 from the gate (i.e., in the illustrated example, the gate at the central portion of the preform 2) 14a through the runner 16a connecting to the cavity 9a.

It should be noted that when closing the runner core 17b, a gap of not less than 1 mm and not more than 2 mm, for example, is intended to be formed in the runner 16b for the pressure retention in the cavity 9b.

The method repeatedly performs the above-described S207 (resin-charge end determination step) and S208 (runner core closing step) until the method: determines that the resin is completely charged into each cavity in the mold 10; sequentially closes the runner core disposed for the runner connecting to the cavity; finally determines that the resin is completely charged into all of the cavities in the mold 10; and entirely closes the runner cores disposed for the runners connecting to the cavities.

(Fully tightening step: S209)

Figure 8:
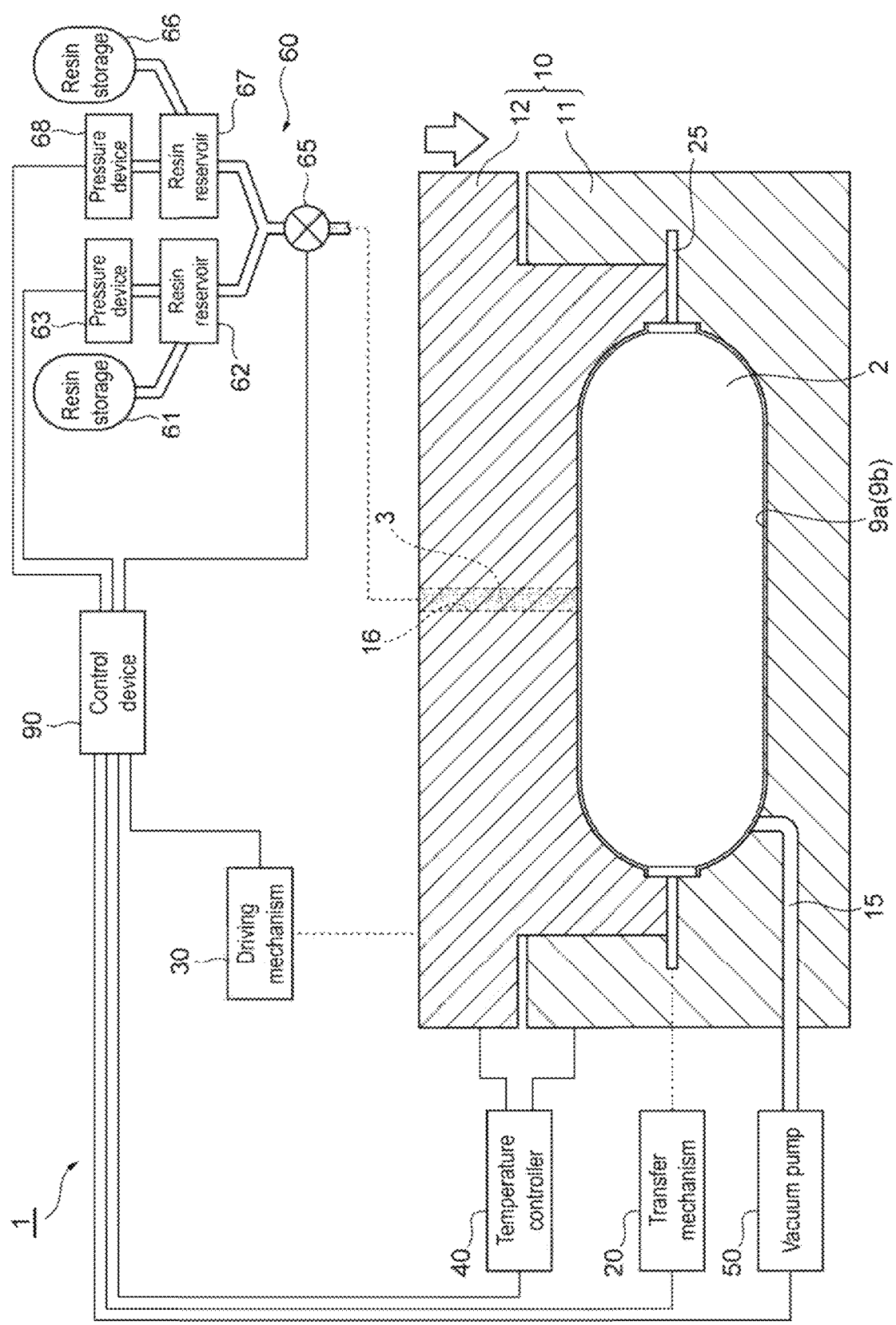
FIG. 8 is a vertical cross-sectional view of the manufacturing device of a high-pressure tank, showing a fully tightening step according to the embodiment.

After the charging of the resin 3 into all of the cavities 9a, 9b in the mold 10 ends and the control device 90 controls the driving mechanism 30 to close all of the runner cores 17a, 17b (FIG. 7), the control device 90 controls the driving mechanism 30 to lower the upper mold 12 to the lower end to completely close the mold (i.e., bring it closer to the preforms 2) and completely close (fully tightening) the upper mold 12 and the lower mold 11 (FIG. 8). This keeps compressive filling with the resin 3 in the mold 10 (in all of the cavities 9a, 9b), and allows impregnation with the resin 3 in the lamination of the fiber layer of each preform 2.

(Resin-pouring stop step: S210)

Figure 9:
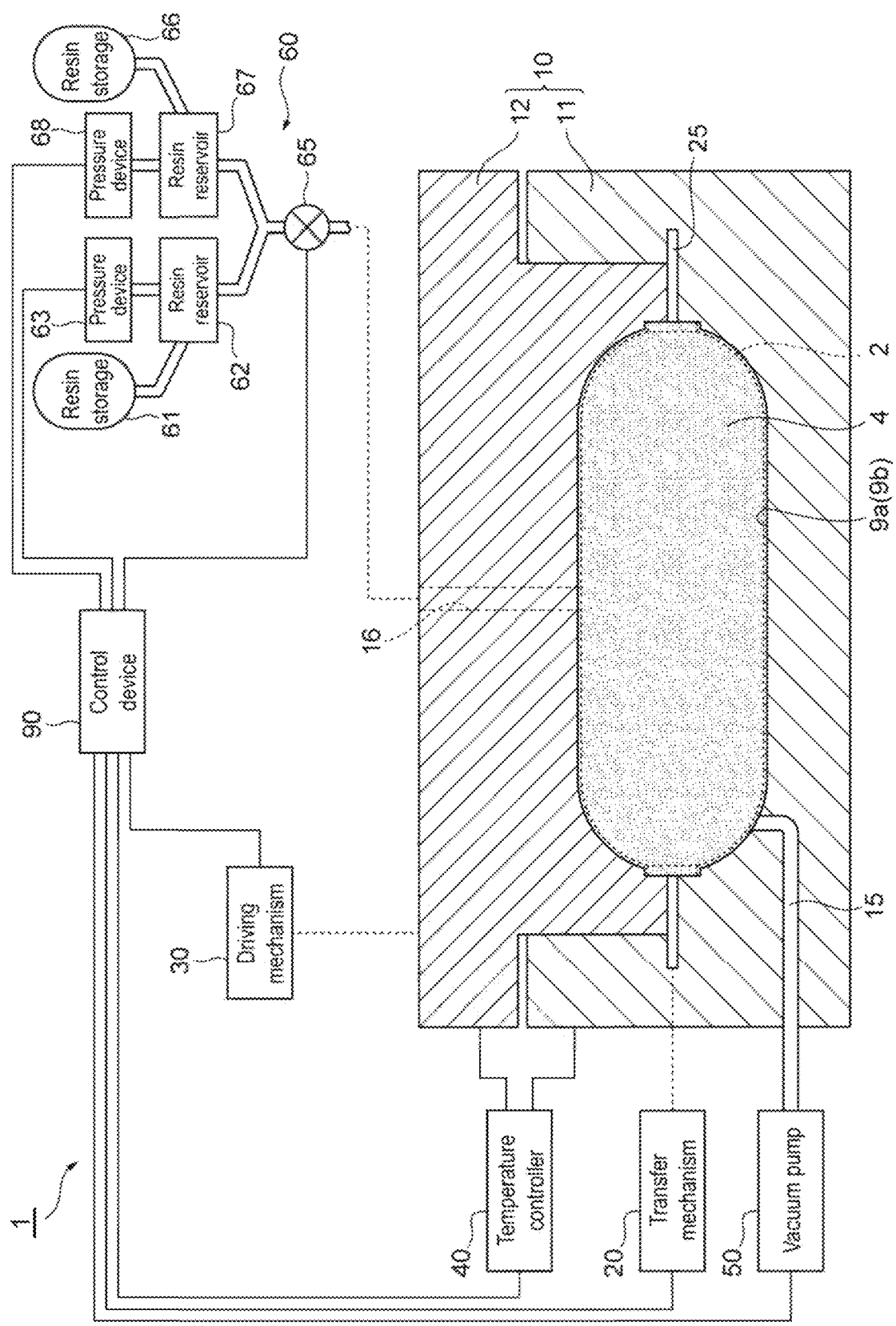
FIG. 9 is a vertical cross-sectional view of the manufacturing device of a high-pressure tank, showing a resin-pouring stop step and a resin curing step according to the embodiment.

After the fiber layer is completely impregnated with the resin 3, the pouring of the resin 3 stops (FIG. 9).

(Rein curing step: S211)

After the pouring of the resin 3 stops as stated above, the method cures the resin 3 (FIG. 9).

(Demolding step: S212)

After the resin 3 is cured, the control device 90 controls the driving mechanism 30 to open the upper mold 12. When the curing of the resin 3 ends, a high-pressure tank 4 having the fiber reinforced resin layer formed on the outer periphery of the liner is obtained.

It should be noted that the condition for injecting and pouring the resin 3 into the mold 10 is set beforehand such that the resin is completely charged into each of the cavities 9a, 9b within a predetermined time. In S207 (resin-charge end determination step) and S208 (runner core closing step), however, in case of a delay from a predetermined time (for example, the time after a lapse of a preset time from the start of resin pouring, the time after a lapse of a preset time from the timing of resin-charge end determination in a certain cavity) in the timing when it is determined that the resin injection amount in the cavity is greater than or equal to a predetermined value and the resin is completely charged, that is, in this example, the timing when the pressure of the resin 3 detected by each of the pressure sensors 13a, 13b disposed for the cavities is higher than or equal to a predetermined threshold (for example, a threshold determined on the basis of the pressure of the resin 3 flowing through the resin pouring pipe 16), the fiber reinforced resin molded article formed in the cavity may be determined as a defect.

In addition, in S207 (resin-charge end determination step) and S208 (runner core closing step), if it is not determined that the resin injection amount in the cavity is greater than or equal to a predetermined value and the resin is completely charged even after a lapse of a predetermined time from the start of resin pouring, the runner core disposed for the runner connecting to the cavity may be closed to perform the next step, and the fiber reinforced resin molded article formed in the cavity may be determined as a defect.

As described above, when a plurality of tanks (preforms 2) is simultaneously formed by resin impregnation using the RTM resin impregnation technology to increase productivity in the manufacturing of high-pressure tanks for fuel cell vehicles, an imbalance in resin pouring may cause poor resin impregnation and critical quality problems leading to the degradation of the performance of the high-pressure tanks.

In the resin impregnation (resin charge) by the RTM resin impregnation technology, the present embodiment detects resin charge timings with the pressure sensors 13a, 13b each disposed at the resin flow end portion of each tank (cavity) and controls the resin flow rates in the runners 16a, 16b through which the resin flows by moving the runner cores 17a, 17b.

When placing the plurality of tanks (preforms 2) in the mold 10 and mold clamping, forming a gap between the lower mold 11 and the upper mold 12 forms a gap between the upper mold 12 and the tanks (preforms 2), and the resin injection amounts in the cavities are controlled. At the respective timings when the pressure sensors 13a, 13b disposed at the resin flow end portions detect resin charge, the runners 16a, 16b through which the resin flows are closed to stop the resin flow, and at the timing when the resin is filled into all of the cavities 9a, 9b, the upper mold 12 is lowered again for compressive filling, thereby controlling the resin impregnation amounts in the plurality of tanks (preforms 2). It should be noted that when closing the runners 16a, 16b, a small gap (about 1 to 2 mm) is formed in the runner cores 17a, 17b (corresponding to the gap in the runners 16a, 16b) for pressure retention, so that the impregnation is balanced between the cavities. In addition, the resin injection amount is controlled in the resin impregnation while feedback-controlling the pressure behavior in the mold 10 for each of the cavities 9a, 9b.

As described above, in the charging of resin by the RTM resin impregnation technology, the present embodiment can detect resin charge timings with the pressure sensors 13a, 13b each disposed at the resin flow end portion of each tank (cavity) and control the resin flow rates. In addition, the present embodiment can simultaneously form a plurality of tanks (preforms 2) by resin impregnation, and this increases productivity and reduces costs. Furthermore, when closing the runners 16a, 16b, a small gap (about 1 to 2 mm) is formed in the runner cores 17a, 17b (corresponding to the gap in the runners 16a, 16b) for pressure retention, so the present embodiment can retain the pressure in each cavity and also increase the quality. In addition, the present embodiment can control the resin injection amount in the resin impregnation while feedback-controlling the pressure behavior in the mold 10 for each of the cavities 9a, 9b.

In view of the above, when a plurality of high-pressure tanks is formed simultaneously by the RTM resin impregnation technology, the present embodiment controls the resin impregnation amount in each of the cavities 9a, 9b so as to increase a balance in resin pouring between the plurality of tanks and the resin impregnation in the plurality of tanks. This can increase the performance of all of the high-pressure tanks and obtain high-pressure tanks with excellent quality.

As described above, according to the present embodiment, it is possible to first detect that a predetermined amount (the same amount) of resin has been individually poured into the plurality of the cavities 9a, 9b provided in the mold 10 and then impregnate (compressively fill) the fiber layers of the preforms 2 with the resin. This can reduce the occurrence of a preform 2 with poor resin impregnation.

In addition, with use of the pressure sensors 13a, 13b, it is possible to precisely detect the resin injection amount in each of the cavities 9a, 9b.

Furthermore, when closing the runners 16a, 16b, forming a small gap in the runners 16a, 16b can retain the pressure in the cavities 9a, 9b, and thus can increase resin impregnation in each of the cavities 9a, 9b.

That is a detailed description of the embodiment of the present disclosure referring to the drawings. The specific configuration of the present disclosure is not limited to the above-stated embodiment, and the design may be modified variously without departing from the spirits of the present disclosure. The present disclosure covers such modified embodiments.

DESCRIPTION OF SYMBOLS

1 Manufacturing device of high-pressure tank (fiber reinforced resin molded article)
2 Preform
3 Resin
4 High-pressure tank (fiber reinforced resin molded article)
9a, 9b Cavity
10 Mold
11 Lower mold (first mold)
11a, 11b Mounting groove
12 Upper mold (second mold)
13a, 13b Pressure sensor
14a, 14b Gate (resin inlet)
15 Vacuum degassing pipe (vacuum degassing mechanism)
16 Resin pouring pipe (resin pouring mechanism)
16a. 16b Runner (resin pouring mechanism)
17a, 17b Runner core (open/close mechanism)
20 Transfer mechanism
25 Shaft
30 Driving mechanism
40 Temperature controller
50 Vacuum pump (vacuum degassing mechanism)
60 Resin injector (resin pouring mechanism)
61, 66 Resin storage
62, 67 Resin reservoir
63, 68 Pressure device
65 Valve
90 Control device

What is claimed is:

1. A method for manufacturing a fiber reinforced resin molded article, the method including forming a preform including a fiber layer on an outer surface of a liner, impregnating the fiber layer of the preform with resin, and curing the resin, comprising:

a step of preparing a mold including a first mold and a second mold, the first mold and the second mold forming a plurality of cavities, each being provided with a runner for pouring resin thereinto;

a step of placing the preform in each cavity between the first mold and the second mold so as to define a first gap between the first mold and the preform and a second gap between the second mold and the preform, the second gap being larger than the first gap;

a step of pouring resin into each cavity through a runner thereof;

a step of sequentially closing each runner connecting to each respective cavity of the plurality of cavities, wherein in the step of closing each runner, a gap is formed in the respective runner for pressure retention, and wherein a fiber reinforced resin molded article formed in one of the plurality of cavities is determined to be defective when the time it takes for a resin injection amount in the cavity to be greater than or equal to a predetermined value is greater than a predetermined time, and wherein a fiber reinforced resin molded article formed in one of the plurality of cavities is determined to be defective when the runner to the cavity is closed and a resin injection amount in the cavity is less than a predetermined value even after a lapse of a predetermined time from start of resin pouring into the cavity; and a step of bringing the second mold close to the preform for compressive filling with the resin in each cavity after it is determined that resin injection amounts in all of the cavities are greater than or equal to a predetermined value.

2. The method for manufacturing a fiber reinforced resin molded article to claim 1, wherein in the step of closing each runner, when a pressure of resin detected by a pressure sensor disposed for each cavity is higher than or equal to a predetermined threshold, it is determined that a resin injection amount in a cavity is greater that or equal to a predetermined value.

* * * * *